(12) United States Patent
West et al.

(10) Patent No.: US 11,711,436 B2
(45) Date of Patent: *Jul. 25, 2023

(54) AGGREGATED CONVERSION MEASUREMENT

(71) Applicant: Google LLC, Mountain View, CA (US)

(72) Inventors: Mike West, Munich (DE); Yian Gao, Sunnyvale, CA (US); Gang Wang, Jersey City, NJ (US); Charles Harrison, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,623

(22) Filed: Nov. 29, 2021

(65) Prior Publication Data
US 2022/0086240 A1 Mar. 17, 2022

Related U.S. Application Data

(63) Continuation of application No. 16/980,378, filed as application No. PCT/US2019/027735 on Apr. 16, 2019, now Pat. No. 11,212,351.

(51) Int. Cl.
*H04L 67/146* (2022.01)
*H04L 67/53* (2022.01)
(Continued)

(52) U.S. Cl.
CPC .......... *H04L 67/146* (2013.01); *H04L 67/133* (2022.05); *H04L 67/53* (2022.05); *H04L 67/535* (2022.05); *H04L 67/568* (2022.05)

(58) Field of Classification Search
None
See application file for complete search history.

(56) References Cited

U.S. PATENT DOCUMENTS

| 8,935,798 B1 | 1/2015 | Smith | |
|---|---|---|---|
| 2005/0255833 A1* | 11/2005 | Bar-Or | ............... H04W 4/12 455/517 |

(Continued)

FOREIGN PATENT DOCUMENTS

| JP | 2009-123143 | 6/2009 |
|---|---|---|
| JP | 2018-133113 | 8/2018 |

OTHER PUBLICATIONS

International Search Report and Written Opinion in International Appln. No. PCT/US2019/027735, dated Jan. 2, 2020, 14 pages.

(Continued)

*Primary Examiner* — Anh Nguyen
(74) *Attorney, Agent, or Firm* — Fish & Richardson P.C.

(57) ABSTRACT

Systems and methods described herein can relate to a web browser-based application programming interface (API) that can control the authorization of data transmissions within a networked environment. The system enables content items displayed in a web page to make a call to the browser to request that the browser register the content item with the browser. The web browser can control the network transmissions to content items approved or authorized by the web browser. The system can reduce the number of transmissions that do not result in content for the client device—saving bandwidth and computational resources for the client device.

18 Claims, 4 Drawing Sheets

(51) Int. Cl.
*H04L 67/133* (2022.01)
*H04L 67/50* (2022.01)
*H04L 67/568* (2022.01)

(56) References Cited

U.S. PATENT DOCUMENTS

| | | |
|---|---|---|
| 2010/0125660 A1 | 5/2010 | Murakami |
| 2011/0055314 A1* | 3/2011 | Rosenstein ............ G06F 16/957 715/846 |
| 2011/0072502 A1* | 3/2011 | Song ...................... G06Q 10/10 709/206 |
| 2012/0173345 A1 | 7/2012 | Yanefski et al. |
| 2013/0018721 A1 | 1/2013 | Levine et al. |
| 2014/0068407 A1 | 3/2014 | Suh |
| 2015/0012612 A1* | 1/2015 | Liu ........................ H04L 67/02 709/217 |
| 2016/0173509 A1* | 6/2016 | Ray .................... H04L 63/1425 726/23 |
| 2017/0180229 A1 | 6/2017 | Toksoz et al. |
| 2017/0199850 A1 | 7/2017 | Mishra |
| 2018/0034850 A1* | 2/2018 | Turgeman ............... G06F 21/31 |

OTHER PUBLICATIONS

Office Action in Chinese Appln. No. 201980023653.2, dated Jun. 3, 2021, 11 pages (with English translation).
Office Action in Indian Appln No. 202027038542, dated Dec. 1, 2021, 7 pages (with English translation).
Office Action in Japanese Appln No. 2020-552762, dated Dec. 24, 2021, 5 pages (with English translation).
Office Action in Japanese Appln. No. 2020-552762, dated Jul. 5, 2021, 6 pages (with English translation).
Office Action in Korean Appln. No. 10-2020-7027401, dated Mar. 4, 2021, 2 pages (with English translation).
Office Action in Indian Appln No. 202228007142, dated Jan. 2, 2023, 7 pages (with English translation).
Office Action in Japanese Appln. No. 2022-007894, dated Feb. 20, 2023, 8 pages (with English translation).

* cited by examiner

AGGREGATED CONVERSION MEASUREMENT

CROSS-REFERENCE TO RELATED APPLICATIONS

This application is a continuation of U.S. application Ser. No. 16/980,378, filed on Sep. 11, 2020, which is a national stage application filed under 35 U.S.C. 371, of PCT Application No. PCT/US2019/027735, filed on Apr. 16, 2019. The disclosures of the prior applications are considered part of and are incorporated by reference in the disclosure of this application.

BACKGROUND OF THE DISCLOSURE

When a client device visits a website, the website can transmit small packets of data to the client device. The small packets of data can include preferences, session information, or be used to authenticate and maintain a session between the client device and the device hosting the website. The data stored by the website can be stored indefinitely or can be purged at regular intervals. Web browsers can prevent domains from accessing the data of other domains or from storing data on the client device when the client device is not in an active session with the domain.

SUMMARY OF THE DISCLOSURE

Content items provided by a third-party to fill a content slots on a web page can be associated with a secondary web page. The secondary web page can be referred to as a landing page because activation (e.g., clicking on) the content item can take the web browser to the secondary page. For example, the content item can include a HTML link to the secondary web page. In some implementations, the user may view the content item but not activate the content item to visit the landing page. Then, at a later time and without activating the content item, the user may independently navigate to the landing page. Attribution of the visit to the landing page can be difficult in "non-cookie" environments that prevent the use of third-party cookies. The system and method described herein can attribute the navigation to the landing page to the content item while increasing user privacy.

For example, the system described herein can include a browser-based application programming interface (API). The API enables content items displayed in a web page to make a call to the browser to request that the browser register the content item with the browser. The request (e.g., the call to the API) can include: landing page URLs, conversion reporting URLs, and campaign IDs. After the content item is registered with the browser, and the browser visits different URLs, the browser can compare the URLs of the present page against the landing page URLs registered with the browser. When the browser determines that it is visiting one of the registered landing page URLs, the browser can generate a response message to the conversion reporting URL associated with the landing page URL. The browser can set and enforce a number of policies for the registration of content items with the browser and for the transmission of the response message to the conversion reporting URL. For example, the policies can set timing requirements that require the content item to be displayed for a predetermined length of time before registration can occur, display requirements that prevent non-visible or small (e.g., tracking pixels) from registering with the browser, among others.

According to at least one aspect of the disclosure, a method to authorize data transmissions in a networked environment can include receiving, by a web browser executed by a client device, a registration request from a content item displayed by the web browser. The registration request can include a first uniform resource locator (URL) and a second URL. The method can include storing, by the web browser executed by the client device, the first URL, the second URL, and a timestamp to a registration table stored at the client device. The method can include identifying, by the web browser executed by the client device, a third URL of a web page displayed by the web browser. The method can include determining, by the web browser executed by the client device, that the third URL matches the first URL stored in the registration table and a display time of the web page is within a predetermined time duration of the timestamp. The method can include transmitting, by the web browser executed by the client device, a message to the second URL.

According to at least one aspect of the disclosure, a system to authorize data transmissions in a networked environment can include a web browser executed by a client device. The web browser can execute or include a conversion engine to receive a registration request from a content item displayed by the web browser, wherein the registration request comprises a first URL and a second URL. The conversion engine can store the first URL, the second URL, and a timestamp to a registration table stored at the client device. The conversion engine can identify a third URL of a web page displayed by the web browser. The conversion engine can determine that the third URL matches the first URL stored in the registration table and a display time of the web page is within a predetermined time duration of the timestamp. The conversion engine can transmit a message to the second URL.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
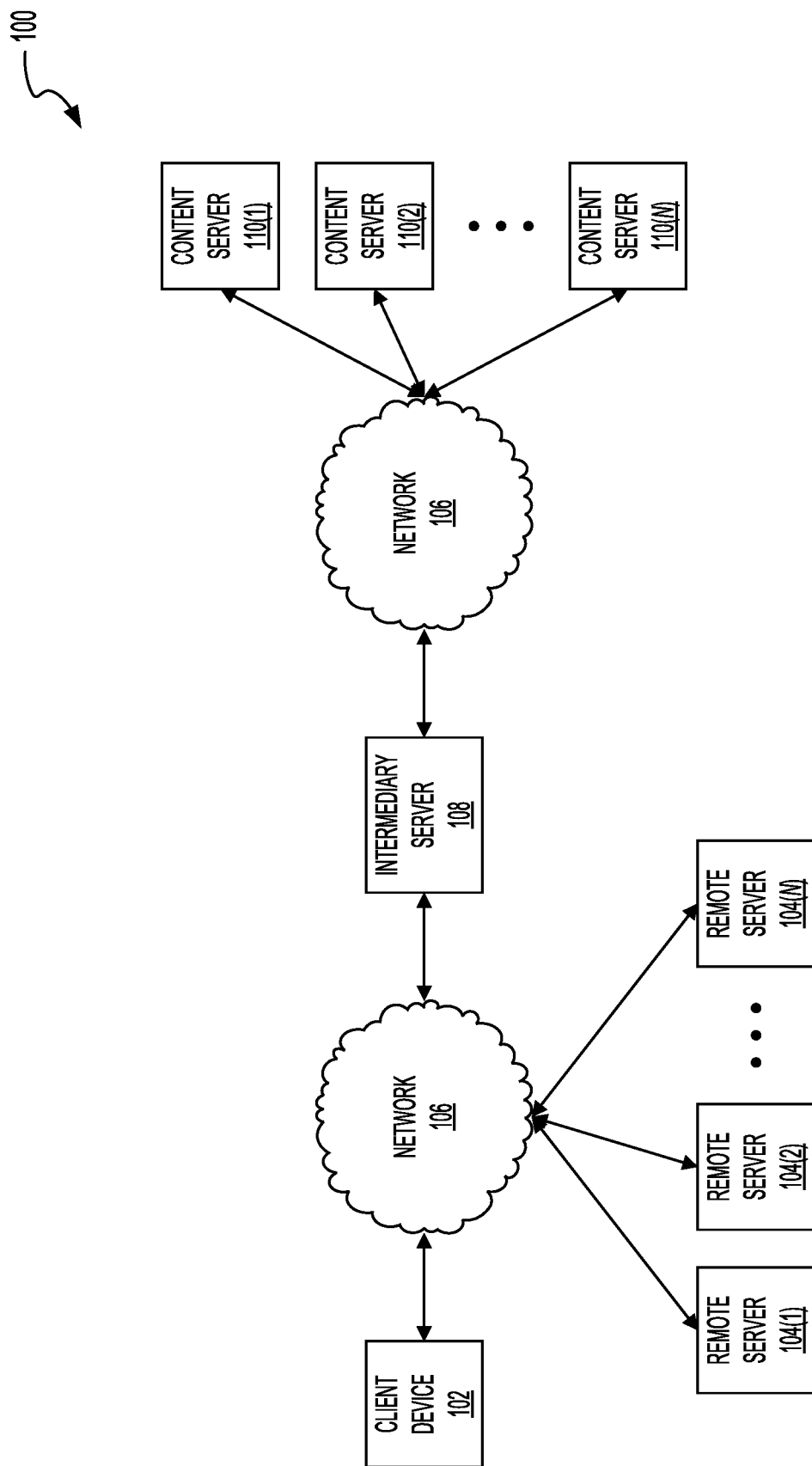
FIG. 1 illustrates a block diagram of a network and device environment for data exchange, according to some implementations.

The various concepts introduced above and discussed in greater detail below may be implemented in any of numerous ways, as the described concepts are not limited to any particular manner of implementation. Examples of specific implementations and applications are provided primarily for illustrative purposes.

Content downloaded from the internet and displayed, for example, within a web browser can request additional content from third-party servers. For example, a web page, executed by a client device, can include one or more content slots that can include processor executable instructions (e.g., JavaScript) that can cause the web browser to request content for the content slots from third-party servers. The web browser can automatically generate the requests when rendering the web page. In some implementations, the processor executable instructions can instruct the web browser to generate one or more requests that do not result in the generation or display of content in the rendered web page. For example, the request that the web browser can send to servers can include status notifications or updates to the third-party server that provided content for the web page. The additional content requests and responses can result in wasted bandwidth and computational resources for the client device that do not result in the client device receiving additional content for rendering to the user. The systems and methods described herein can reduce the number of transmissions that do not result in content for the client device—saving bandwidth and computational resources for the client device. Additionally, the systems and methods can control the authorization of the response or request's transmission, which can increase the privacy for a user of the client device.

For example, content items provided by a third-party to fill a content slots on a web page can be associated with a secondary web page. The secondary web page can be referred to as a landing page because activation (e.g., clicking on) the content item can take the web browser to the secondary page. For example, the content item can include a HTML link to the secondary web page. In some implementations, the user may view the content item but not activate the content item to visit the landing page. Then, at a later time and without activating the content item, the user may independently navigate to the landing page. Attribution of the visit to the landing page can be difficult in "non-cookie" environments that prevent the use of third-party cookies. The system and method described herein can attribute the navigation to the landing page to the content item while increasing user privacy.

For example, the system described herein can include a browser-based application programming interface (API). The API enables content items displayed in a web page to make a call to the browser to request that the browser register the content item with the browser. The request (e.g., the call to the API) can include: landing page URLs, conversion reporting URLs, and campaign IDs. After the content item is registered with the browser, and the browser visits different URLs, the browser can compare the URLs of the present page against the landing page URLs registered with the browser. When the browser determines that it is visiting one of the registered landing page URLs, the browser can generate a response message to the conversion reporting URL associated with the landing page URL. In some implementations, the response message can be referred to as a message or a request message. The browser can set and enforce a number of policies for the registration of content items with the browser and for the transmission of the response message to the conversion reporting URL. For example, the policies can set timing requirements that require the content item to be displayed for a predetermined length of time before registration can occur, display requirements that prevent non-visible or small (e.g., tracking pixels) from registering with the browser, among others.

The present solution provides a number of technical solutions where measurement of conversions cannot be performed in browsers that do not enable third-party cookies. For example, the use of the browser-based API, rather than JavaScript in the content item, protects user privacy in a number of ways. First, while the JavaScript of the content item is not controlled by the user, the browser-based API is a feature of the browser and can be controlled or limited by the user. This enables the user to set what information can be shared and when through the configuration of the above described policies. Second, the browser vendor (or user) can set the maximum length and other requirements (e.g., format) of the response messages to reporting URLs. This can limit the amount of information the browser can transmit to a third-party. For example, the campaign ID can be limited to a short, limited number of characters so that a hash of the user agent and other information about the browser cannot be encoded and sent back to the third-party in the reporting message. Third, the browser can delay or batch process the reporting message to the conversion reporting URLs to disguise the IP address and timing of when the browser visited the landing page URL. Fourth, the browser can transmit the reporting message to a proxy, which then forwards the reporting message to the third-party. The proxy can further obfuscate information contained in the reporting message.

FIG. 1 illustrates a block diagram of an example network and device environment 100 for data exchange. As illustrated, one or more client devices 102 can communicate via networks 106 with one or more content servers 110(1)-110(N), which can be generally referred to as content servers 110. The client device 102 can communicate with the content servers 110 via one or more intermediary servers 108. The client device 102 can include any type and form of computing device, including a desktop computer, laptop computer, portable computer, tablet computer, wearable computer, embedded computer, smart television, console, Internet of Things (IoT) device or smart appliance, or any other type and form of computing device. The client devices 102 can communicate via the networks 106 with one or more remote servers 104(1)-104(N), which can generally be referred to as remote servers 104. Responsive to a request from the client devices 102, the remote servers 104 transmit or otherwise provide primary content (e.g., a web page) to the client device 102. For example, the client device 102 can execute an application to request content. The application can be a web browser, social media application, video game, or other such application. The client device 102 can request content from the remote servers 104 and the content servers 110. For example, the remote servers 104 can host web pages that include content slots. The content slots of the web pages can include JavaScript or other processor-executable instructions that can cause the client device 102 to request content from the content servers 110 (via the intermediary server 108) to fill the content slots. The processor executable instructions can be provided to the remote server 104 by the intermediary server 108 or the content servers 110.

The system 100 can include one or more networks 106. The networks 106 can include type and form of network, including local area networks (LANs), wide area networks (WANs) such as the Internet, satellite networks, cable networks, broadband networks, fiber optic networks, microwave networks, cellular networks, wireless networks, or any combination of these or other such networks. The system 100 can include networks 106 of the same or different types. For example, the network 106 between the client device 102 and the intermediary server 108 can be of a first type and the network 106 between the intermediary server 108 and the content servers 110 can be of a second type. The network 106 between the client device 102 and the intermediary server 108 and the network 106 between the intermediary server 108 and the content servers 110 can be the same network or components of the same network.

The networks 106 can include a plurality of additional devices, including, for example, gateways, modems, firewalls, routers, switches, etc. The networks 106 can include any number of computing devices (e.g., computer, servers, routers, network switches, etc.) that are configured to receive and/or transmit data within networks 106. The networks 106 can include any number of hardwired and/or wireless connections. A client device 102 can communicate wirelessly (e.g., via WiFi, cellular, radio, etc.) with a transceiver that is hardwired (e.g., via a fiber optic cable, a CAT5 cable, etc.) to other computing devices within the networks 106. The networks 106 can include or can be virtual networks, such as a virtual network between a plurality of virtual machines executed by a single physical machine, or an abstract network such as an offline transfer of data via physically movable media (e.g. a Sneakernet, transferring data via tape media, CD-ROM, flash media, external hard drives, floppy disks, etc.).

The system 100 can include one or more intermediary servers 108. The intermediary server 108 can manage content requests received from the client device 102. The content requests can be for content, which can also be referred to as secondary content or content items, to render in content slots of the primary content provided by the remote servers 104. The intermediary server 108 can fulfill the content request from a plurality of content servers 110. For example, the intermediary server 108 can receive a request for content from the client device 102 and can select from among content servers 110 a content server 110 to provide the requested content. The selection can be via a load balancing algorithms, auction algorithms (e.g. with the content servers 110 bidding for opportunities to provide content), etc. The intermediary server 108 can thus be referred to as an exchange server, a load balancer, an auction provider, or by any other such term.

The system 100 can include one or more content servers 110. The content servers 110 can include content repositories. The content servers 110 can select content from the content repositories in response to receiving a content request from the intermediary server 108 or the client device 102. In some implementations, the content request from the client device 102 can include an identifier, such as a cookie, provided to the client device 102 by the content server 110 in an earlier data exchange. The content server 110 can select content from the content repository based on the identifier. For example, the content server 110 can associate the identifier with such as, but not limited to, preferences and computational resources of the client device 102 (e.g., screen size and resolution), among others. The content server 110 can select the content from the data repository based on the data associated with the identifier.

The system 100 can include one or more remote servers 104. The remote servers 104 can host primary content. The primary content can include web pages, social medial pages, audio content, text convent, video content, and other forms of data. The primary content can include content slots. The content slots can include processor executable instructions that when executed by a browser can cause the browser to request content from an intermediary server 108 or content server 110 for content to fill the content slot. In some implementations, the primary content hosted by the remote servers 104 can be associated with the secondary content provided by the content servers 110. For example, the primary content hosted by the remote servers 104 can serve as landing pages for the secondary content. The primary content can be a landing page for secondary content when the secondary content includes a link to the primary content. In some implementations, a browser of the client device 102 can navigate independently to a web page hosted by a remote server 104, and in other implementations, the browser can be directed to the web page hosted by the remote server 104 through the activation of (e.g., clicking on) a link rendered as part of secondary content provided by a content server 110.

The intermediary server 108, the remote servers 104, and the content servers 110 can include any type and form of computing device, including desktop computers, servers, workstations, laptop computers, portable computers, embedded computers, or any other type and form of computing device. The intermediary servers 108 and the content servers 110 can include virtual machines executed by one or more physical computing devices, and can be configured as a server farm, cluster, or cloud of devices.

Figure 2:
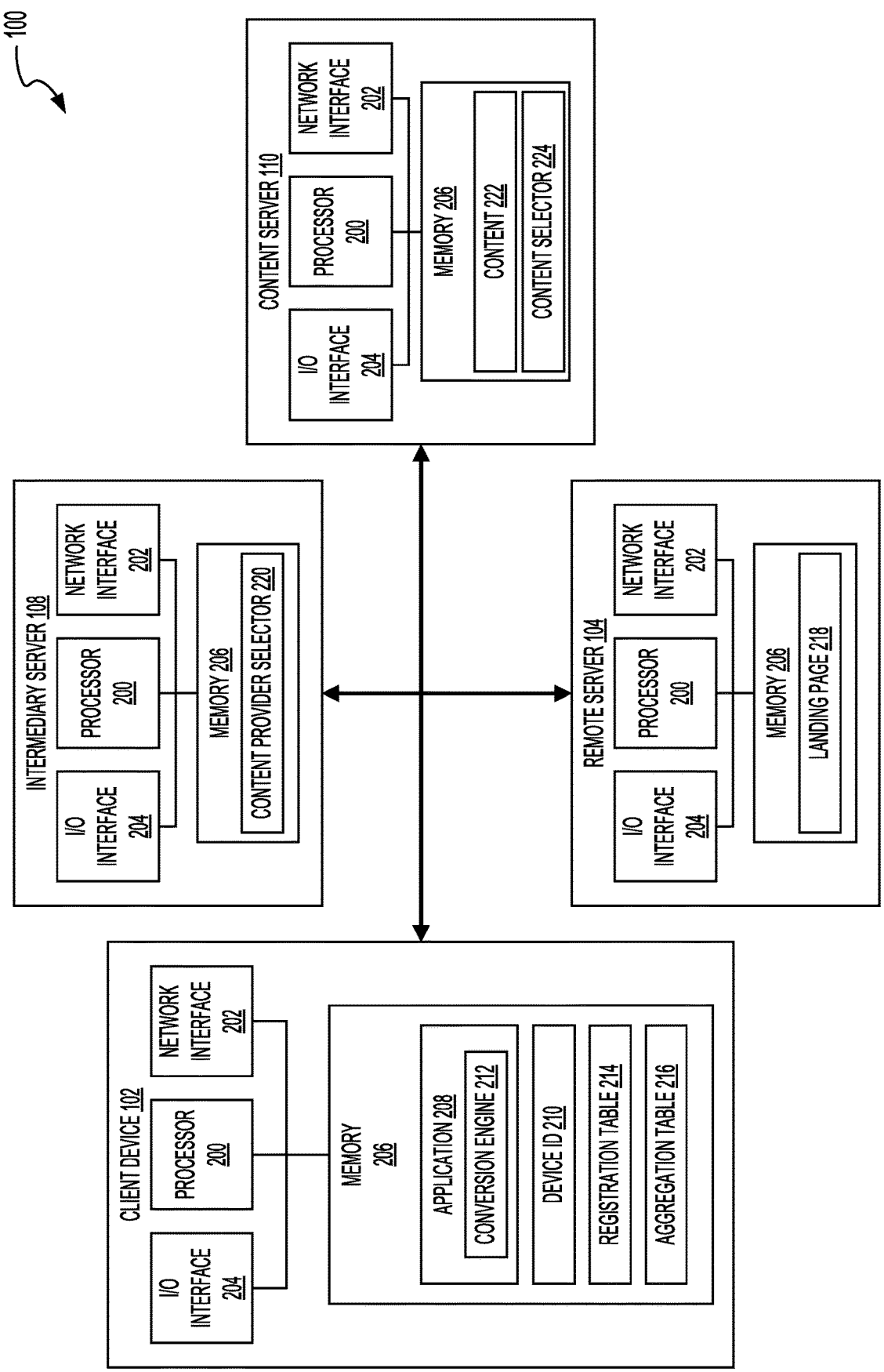
FIG. 2 illustrates a block diagram illustrating implementations of computing devices for use in the network and device environment illustrated in FIG. 1, according to some implementations.

FIG. 2 illustrates a block illustrating example computing devices for data exchange. As described above in relation to FIG. 1, the system 100 can include a client device 102. The client device 102 can execute an application 208, such as a web browser, to receive content from the remote servers 104. The intermediary servers 108 can also provide content, from the content servers 110, to the client device 102.

As discussed above, the client device 102 can be referred to as a client, device, client device, computing device, user device, or any other such term. The client device 102 can include or be a component of a desktop computer, laptop computer, tablet computer, smartphone, video game console, smart television or set top box, server, workstation, or any other type and form of computing device capable of communicating over a network 106. In some implementations, a client device 102 can execute an application 208 for communicating over the network 106. The application 208 can be service, server, daemon, routine, or other executable logic for communicating over a network 106. The application 208 can be a web browser, mail client, video player, music player, video game, or any other such application. Such applications can include a command line interface, graphical user interface, or any combination of these or other interfaces. The application 208 can include an instance of a conversion engine 212.

The client device 102 can include one or more processors 200, network interfaces 202, and I/O interfaces 204. The client device 102 can include memory 206. The memory 206 can store machine instructions that, when executed by processor the 200 cause the processor 200 to perform one or more of the operations described herein. The processor 200 can include a microprocessor, ASIC, FPGA, etc., or combinations thereof. The processor 200 can be a multi-core processor or an array of processors. The memory 206 can include, but is not limited to, electronic, optical, magnetic, or any other storage devices capable of providing processor 200 with program instructions. The memory 206 can include a floppy disk, CD-ROM, DVD, magnetic disk, memory chip, ROM, RAM, EEPROM, EPROM, flash memory, optical media, or any other suitable memory from which processor 200 can read instructions. The instructions can include code from any suitable computer programming language such as, but not limited to, C, C++, C#, Java, JavaScript, Perl, HTML, XML, Python and Visual Basic.

The client device 102 can include one or more network interfaces 202. The network interface 202 can include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 106. The client device 102 can include a plurality of network interfaces 202 of different types, allowing for connections to a variety of networks 106 or a network 106 such as the Internet via different sub-networks.

The client device 102 can include one or more I/O interfaces 204. The I/O interface 204 can be hardware-based or software-based. The I/O interfaces 204 can be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices can be internal to the housing of the client device 102, such as a built-in display, touch screen, microphone, etc., or external to the housing of the client device 102, such as a monitor connected to the client device 102, a speaker connected to the client device 102, etc., according to various implementations.

The client device 102 can store data and processor executable instructions in the memory 206. For example, the client device 102 can store the application 208 as processor executable instructions in the memory 206. The application 208 can be an application, applet, script, service, daemon, routine, or other executable logic for receiving content and displaying or otherwise outputting content via an I/O interface 204 of the client device (e.g. display, speaker, etc.). For example, the application 208 can be a web browser that receives and renders a landing page 218 or other web page or content. The application 208 can include functionality for displaying content received via network interface 202 and/or generated locally by processor 200.

The client device 102 can include a device ID 210. The client device 102 can identify itself to the intermediary server 108, content server 110, or remote server 104 with the device ID 210. The device ID 210 can be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. For example, the device ID 210 can be a hash of the client device's user agent or MAC address. The device identifier 210 can be fixed to the client device 102. For example, the device ID 210 can be preconfigured in the device by the manufacturer. For example, the device ID 210 can be a manufacturer serial number or MAC address. The device ID 210 can be dynamically set the client device 102, remote server 104, intermediary server 108, or content server 110. The device ID 210 can be static. The device ID 210 can be updated at predetermined interfaces. For example, a unique or new device identifier 210 can be set for each communication with the intermediary server 108. The device ID 210 can be changed or updated periodically (e.g. hourly, daily, weekly, etc.) or at other intervals (e.g. on restart of the client device, login to an internet service, etc.). The device ID 210 can be associated with one or more other device identifiers 210 (e.g., a device identifier for a mobile device, a device identifier for a home computer, etc.).

The client device 102 can include a conversion engine 212. The conversion engine 212 can be an application, applet, script, service, daemon, routine, or other executable logic to register content items with the client device 102. The conversion engine 212 can be a component of the application 208 or can be separate from the application 208. For example, the conversion engine 212 can be a script that can be separate from a specific application 208 and can receive API calls from a plurality of applications 208 (e.g., the client devices web browser and email client). As described further in relation to FIGS. 3 and 4, the conversion engine 212 can provide an interface for content items to interact with the application 208. For example, the conversion engine 212 can be a module, sub-routine, or add-on of the application 208. For example, the conversion engine 212 can provide an API or other hooks that enable content items to register with the application 208. For example, the content item can include processor executable instructions that when executed by the application 208 (via the processor 200) make a call to the API. The call can be to register the content item with the application 208. The call can include a payload. The payload can include campaign IDs, landing page URLs, and reporting URLs. When registered with the application 208, the conversion engine 212 can store the contents of the payload in the registration table 214. For example, the registration table 214 can be a table that can include an entry for each of the content items registered with the application 208. Each entry in the table can store, for example, the campaign ID, landing page URL, the reporting URL, and a timestamp. The timestamp can indicate a time that the entry was saved to the registration table 214. In some implementations, the contents of the payload can be indexed in the registration table 214 to the landing page URL.

The memory 206 can include an aggregation table 216. As described further in relation to FIGS. 3 and 4, the conversion engine 212 can include one or more reporting policies. The reporting policies can indicate whether reporting messages should be transmitted to a reporting URL as single messages (e.g., upon generation or with a time delay to protect user privacy) or in batches. When a batch reporting flag is set in the reporting policy, the conversion engine 212 can transmit the reporting messages in batches. Responsive to generating a reporting message, when batch transmissions is active, the conversion engine 212 can save the reporting message to the aggregation table 216 until a batch transmission requirement is met. For example, the reporting policy can indicate that the batch transmissions should be transmitted periodically (e.g., every 12 hours). The conversion engine 212 can save generated reporting messages to the aggregation table 216 until a transmission time is triggered (e.g., 00:00 hrs or 12:00 hrs in the above example). The conversion engine 212 can then read the reporting messages from the aggregation table 216 and transmit the reporting messages to a respective reporting URL. The conversion engine 212 can purge or otherwise delete the reported reporting messages from the aggregation table 216. In some implementations, the reporting policy can be generated a landing page (e.g., a remote server 104). For example, the remote server 104 can specify which reporting URLs or URLs can receive reporting messages or other indications of a conversion event.

Also as illustrated in FIG. 2, the system 100 can include an intermediary server 108. As with client devices 102, intermediary server 108 can include one or more processors 200, memory 206, network interfaces 202, and I/O interfaces 204. The intermediary server 108 can communicate with the client device 102, the content servers 110, or the remote servers 104 via the network 106. The memory 206 of the intermediary server 108 can store one or more applications for execution by the processor 200 of the intermediary server 108. For example, the intermediary servers 108 can include applications that enable the intermediary servers 108 to function as FTP servers, web servers, mail servers, file sharing servers, peer to peer servers, or other such applications for delivering content or redirection commands to allow clients to access content at a content server 110.

The intermediary server 108 can include a content provider selector 220. The content provider selector 220 can include applications, servers, services, daemons, routines, or other executable logic. The content provider selector 220 can be configured to select content servers 110 from a list of content servers 110. For example, the content provider selector 220 can select a content server 110 from a list of content servers 110 using a round robin or other load balancing system, or via an auction-based system. The content provider selector 220 may be configured to transmit requests to and receives responses from the content servers 110, such as bids for opportunities to provide content to a client device 102. The content servers 110 can be configured to generate a response to a request of a client device 102 that can include identifiers, such as domains or addresses, of selected content servers 110, so that the client device 102 can generate or retrieve the device ID 210 and provide the device ID 210 to the intermediary server 108 or content server 110 for the selection of a content item.

Also as illustrated in FIG. 2, the system 100 can include a plurality of content servers 110. Each of the content servers 110 can include one or more computing devices connected to network 106 and configured for providing content items (e.g., content 222) to a client device 102, either directly or via the intermediary server 108. The content 222 provided by the content servers 110 can be referred to a secondary content because the content 222 can be rendered into content slots of primary content provided by, for example, the remote servers 104. In some implementations, the content 222 can be or can include primary content. A content server 110 can be referred to variously as a content provider, server, web server, data server, publisher, service provider, or by other similar terms. The content server 110 can include a plurality of computing devices configured as a server farm or cloud, and may include routers, load balancers, network address translators, firewalls, or other such devices. The content servers 110 can be computer servers (e.g., FTP servers, file sharing servers, web servers, etc.) or combinations of servers (e.g., data centers, cloud computing platforms, etc.). The content servers 110 can provide any type and form of content, including text, images, video, audio, multimedia, or other data, or any combination of these. The content 222 can include live media content, prerecorded media content, rendered content, movies, television shows, podcasts, video blogs, video games or other interactive content, advertising in any format, social media, or any other type and form of content.

The content server 110 can include one or more processors 200, network interfaces 202, I/O interfaces 204, and/or memory 206. The content server 110 can include a content selector 224. The content selector 224 can include an application, service, server, daemon, routine, or other executable logic for selecting content 222 for delivery to a client device 102. The content selector 224 may select content 222 for delivery to the client device 102 based on information about the client device 102 stored in an identifier database. For example, the database may include information about device capabilities (e.g. screen resolution or orientation, color depth, bandwidth, etc.) or any other such information for selection of customized content. The information can be indexed in the database by the device ID. The content selector 224 can select the information from the database based on the device ID 210 received from the client device 102. Responsive to selecting the content 222, the content selector 224 can push, stream, or otherwise transfer the content 222 to the client device 102. The content 222 can be any type and form of data, including audio, video, animations, text, multimedia, still or animated graphics, executable scripts, or any other type and form of content. Each item of content 222 can be associated with tags, identifiers, ULRs, or processor executable instructions. For example, each content 222 can include processor executable instructions such that when the application 208 renders and displays the content 222, selection (e.g., clicking) of the rendered content 222 can redirect the application 208 to a URL identified by the content 222. For example, the content 222 can include a HTML, tags that identify the content 222 as containing a web link (e.g., URL) to a second web page. The URL can be the URL for a landing page 218 hosted by a remote server 104. The content 222 can include or otherwise contain a reporting URL and a campaign ID. The campaign ID can identify a class, group, subject matter, type, or other characteristic of the content 222 to the content server 110. The reporting URL can be a URL of a networked server that is pinged when the content 222 is rendered by client device 102 application 208. The reporting URL can be the URL of the intermediary server 108, the content server 110, or other networked server.

Also as illustrated in FIG. 2, the system 100 can include one or more remote servers 104. A remote server 104 can include one or more processors 200, network interfaces 202, and/or I/O interfaces 204. The memory 206 of the remote server 104 can store one or more applications for execution by the processor 200 of the remote server 104. For example, the remote server 104 can include applications that enable the remote server 104 to function as FTP servers, web servers, mail servers, file sharing servers, peer to peer servers, or other such applications for delivering content to the client device 102. For example, the remote server 104 can include one or more landing pages 218 stored in the memory 206. The landing page 218 can be a web page or other type of content, such as, but not limited to audio, video, animations, text, multimedia, still or animated graphics, executable scripts, or any other type and form of content. Each landing page 218 can be identified by a URL. To retrieve or access the landing page 218, the URL can be entered into the application 208 of the client device 102. The client device 102 can generate a request to the remote server 104 for the landing page 218 (or other form of content) located at the URL. A landing page 218 can serve as a redirect target of a content 222. For example, when the content 222 is rendered by a web browser, the content 222 can include a hyperlink to the landing page 218 such that when the content 222 is activated (e.g., clicked or selected) by a user, the application 208 can be redirected to the landing page 218. In some implementations, a user of the client device 102 can navigate natively to the landing page 218. For example, the user can enter the landing page's URL into a navigation bar of the web browser or find the landing page 218 through an online search rather than being redirected to the landing page 218 by the activation of a rendered content 222.

Figure 3:
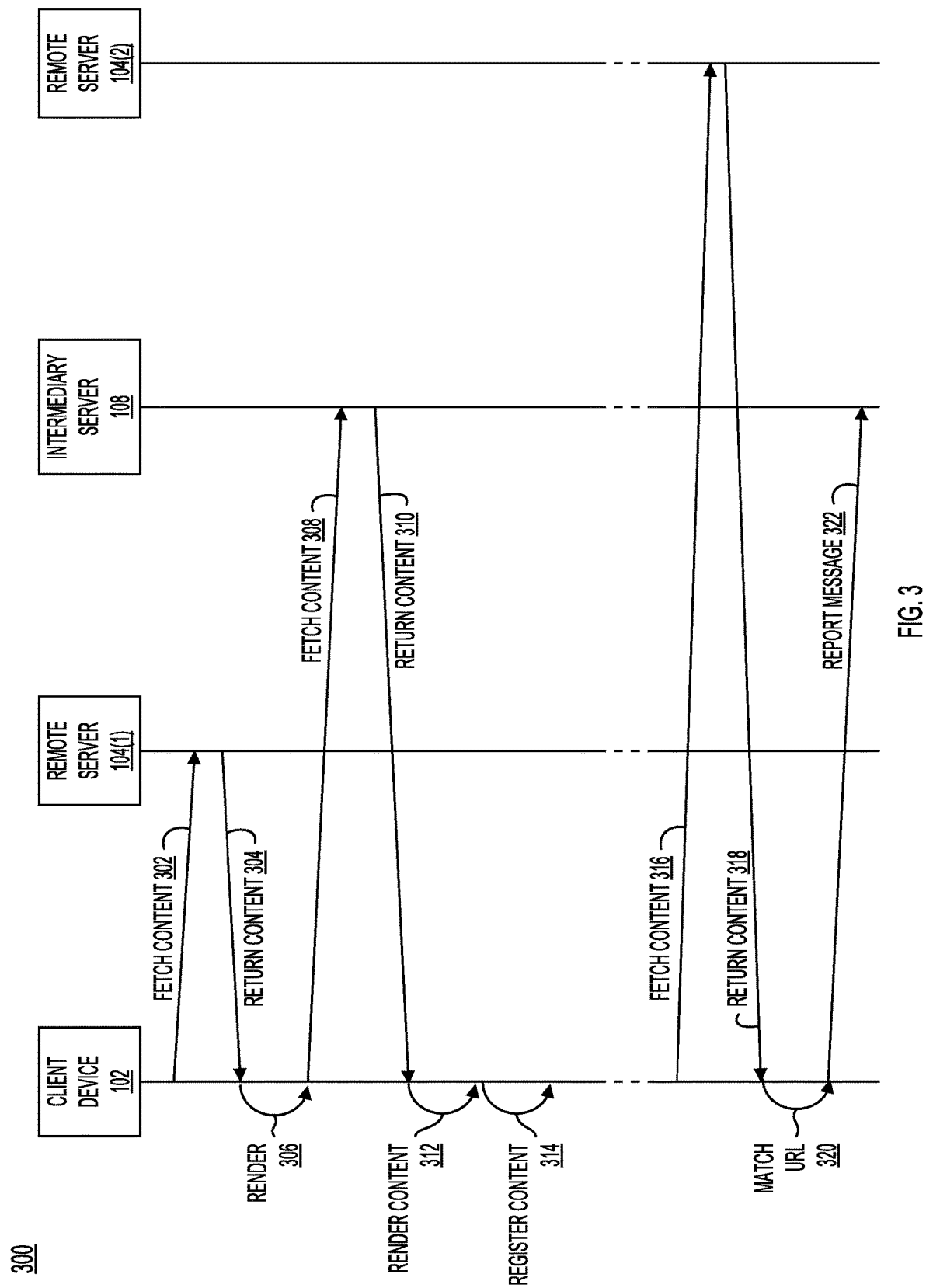
FIG. 3 illustrates a flow diagram of authorizing data exchange in the network and device environment illustrated in FIG. 1, according to some implementations.

FIG. 3 illustrates a flow diagram 300 of authorizing data exchange in a network and device environment. Also referring to FIGS. 1 and 2, at step 302, the client device 102 can fetch content from a first remote server 104(1). For example, the remote server 104(1) can host one or more websites or other primary content. A user can enter or select a URL that points to a website hosted by the remote server 104(1). An application 208 (e.g., a web browser) on the client device 102, can generate a request for the content (e.g., the website) identified by the URL. The client device 102 can transmit the request to the remote server 104(1) through any suitable protocol, such as through a HTTPs request or RESTful request. The request can include a device identifier, account identifier, user identifier, session identifier, or other such identifier, or a cookie generated the remote server 104(1) and stored on the client device. For example, the remote server 104(1) may have previously provided a cookie to client device 102 (e.g. during an authentication procedure or other such event), and client device 102 may provide the same cookie in the request thereafter.

At step 304, the remote server 104(1) can return the content. The content can be a web page or other type of content that is identified in a URL contained within the request. The returned content can include one or more content slots. The content slots can be filled by content 222 from the content servers 110 via the intermediary server 108. The content slots can include processor executable instructions that can cause the application 208 to generate a request to the intermediary server 108 or a content server 110 for content to fill the content slot responsive to the application 208 at least partially rendering (or otherwise executing the instructions of) the content from the remote server 104(1).

At step 306, the client device 102 can render the content from the remote server 104(1). As described above, in one example, the content can be a web page hosted by the remote server 104(1). The content can include processor executable instructions that can cause the application 208 to request additional content from additional network resources such as the intermediary server 108. For example, the web page can include secondary content slots that include the processor executable instructions for requesting content from the intermediary server 108.

At step 308, the client device 102 can fetch content from the intermediary server 108. Rendering the secondary content slots can cause the application 208 to generate a request to the intermediary server 108 for content to fill (e.g., render in) the secondary content slots. The client device 102 can transmit the request to the remote server 104(1) through any suitable protocol, such as through a HTTPs request or RESTful request. The request can include a device identifier, account identifier, user identifier, session identifier, or other such identifier, or a cookie generated or provided by the client device. For example, the remote server 104(1) may have previously provided a cookie to client device 102 (e.g. during an authentication procedure or other such event), and client device 102 may provide the same cookie in the request thereafter.

At step 310, the intermediary server 108 can return the content to the client device 102. In some implementations, the intermediary server 108 can forward the request for content at step 308 to a content server 110. The intermediary server 108 can select a content server 110 to provide the content from a list of content servers 110. For example, the intermediary server 108 can select a content server 110 from a list of content servers 110 using a round robin or other load balancing system, or via an auction-based system. The content server 110 can select a content item to return in response to the request and can transmit the content item directly to the client device 102 or to the client device 102 via the intermediary server 108. For example, the content server 110 can transmit the content item to the intermediary server 108, which can transmit the content item to the client device 102 at step 310.

At step 312, the client device 102 can render the content. The client device 102 can render the content as part of the rendering of the content returned at step 304. For example, the content returned at step 310 can be rendered into the content slot that caused the generation of the request for the content. At step 314, the content item can be registered with the client device 102. Rendering the content item (at step 312) can cause the content item to be registered with the client device 102. For example, the content item can include a payload (e.g., non-visible data) and processor executable instructions. The payload can include, for example, a URL of a landing page, one or more identifiers, and a reporting URL. The content item can also include processor executable instructions that can cause the content item to register with the application 208. For example, the content item can include a call to a, for example, JavaScipt API exposed to the content item by the conversion engine 212 on the client device 102. In another example, the content item can include a tag that can include one or more attributes or processor executable instructions. The call to the API can include the payload of the content item. For example, the call to the API can include the URL of the landing page, one or more identifiers, and the reporting URL. The conversion engine 212 can store the data from the API call into the registration table 214. The steps 302-314 can be repeated a plurality of times. For example, the content provided to the client device 102 from the remote server 104(1) can include multiple content slots for which multiple content items are returned from the intermediary server 108. In some implementations, each of the content items can be registered in registration table 214 via the conversion engine 212. The steps 302-314 can be repeated a plurality of times for a plurality of different first remote servers 104(1). For example, the user can navigate to a plurality of different web page that can each include content slots. The content items returned to fill the content slots for each of the different web pages can be registered in the registration table 214 as the client device 102 navigates to the web pages.

At step 316, the client device 102 can fetch content from a second remote server 104(2). The request for content at step 316 can occur after one or more content items are registered in the registration table 214. The second remote server 104(2), like the first remote server 104(2), can host one or more web pages. In some implementations, one or more of the web pages can be a landing page for one of the content items registered in the registration table 214. The web page can be a landing page for a content item when the content item includes a URL that directs a web browser to the web page. At step 316, the client device 102 can transmit the request to the remote server 104(2) through any suitable protocol, such as through a HTTPs request or RESTful request.

At step 318, the remote server 104(2) can return the requested content. The remote server 104(2) can transmit the content to the client device 102 via HTTP, HTTPS, or other protocol. Responsive to receiving the content from the remote server 104(2), the client device 102 can render, via the web browser, for example, the content. Rendering the content can display the content to the user of the web browser.

At step 320, the conversion engine 212 can match the URL to a URL in the registration table 214. Responsive to rendering the content returned from the remote server 104 (2), the conversion engine 212 can determine if the URL for the returned content is registered in the registration table 214. In some implementations, the data in the registration table 214 can be indexed by URL. In these example, the conversion engine 212 can use the URL of the content returned from the remote server 104(2) as a key. The conversion engine 212 can determine if any data (e.g., a content item identifiers or reporting URLs) are associated with the URL in the registration table 214.

If at step 320 the conversion engine 212 finds a match, at step 322, the conversion engine 212 can transmit a reporting message. The conversion engine 212 can transmit the reporting message to the reporting URL indexed to the matched URL in the registration table 214. In some implementations, the reporting URL can be a URL for or associated with the intermediary server 108 (as illustrated in FIG. 3). In some implementations, the reporting URL can be for a proxy device that receives and forwards the reporting message to a final destination, such as the intermediary server 108. The proxy can process the reporting message to remove identifiable data from the reporting message. For example, the proxy can remove the originating IP address of the reporting message from the reporting message. In some implementations, the reporting URL can be a URL associated with a remote server 104. The reporting message can be a pingback message to the reporting URL. Receipt of the reporting message by the server at the reporting URL can indicate to the server that a client device rendered and displayed a content item and that the client device subsequently independently navigated to the landing page of the content item.

Figure 4:
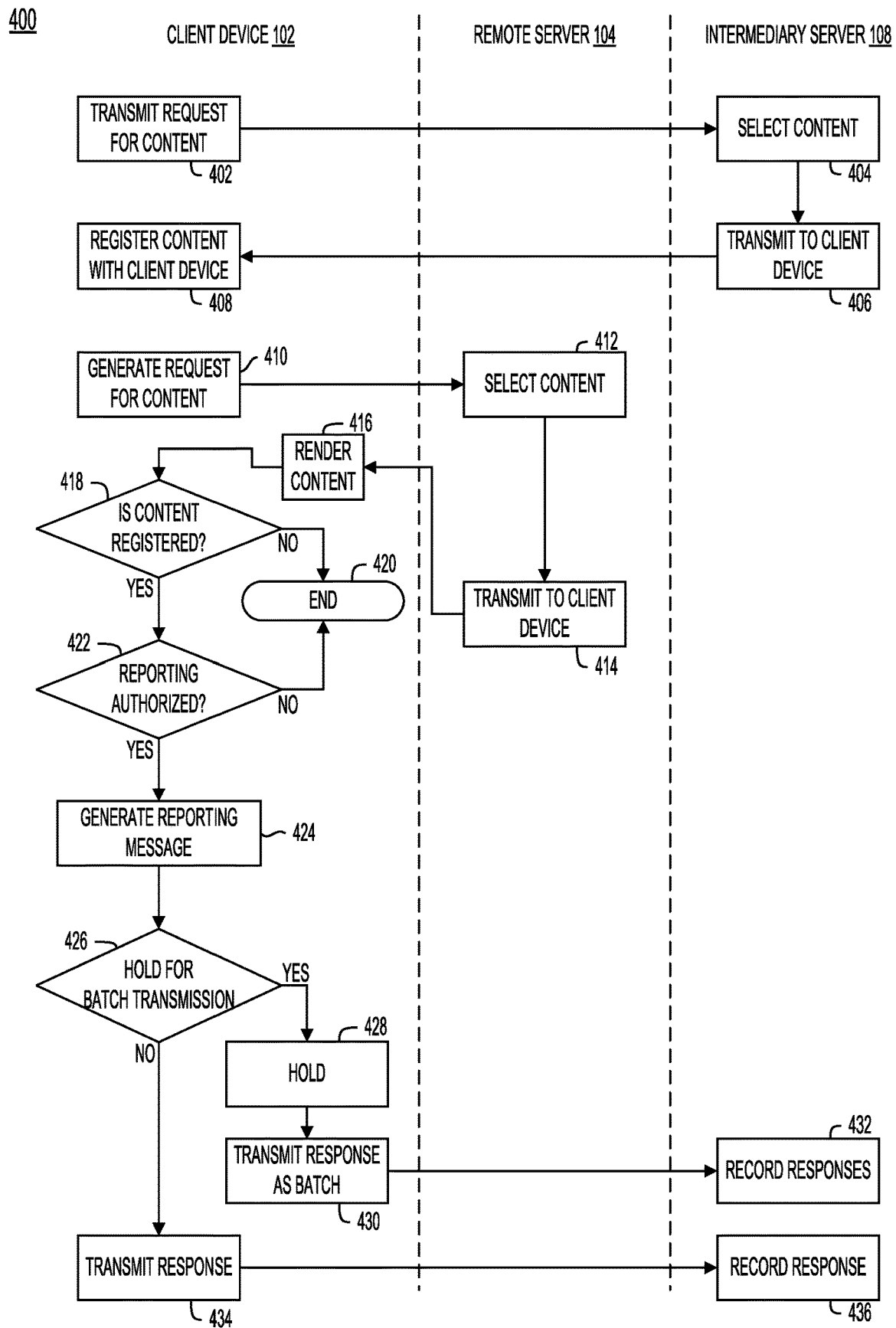
FIG. 4 illustrates a flow chart of an example method to exchange data in the network and device environment illustrated in FIG. 1, according to some implementations.

FIG. 4 illustrates an example method 400 of authorizing data exchange in a network and device environment. The method 400 can indicate the steps performed by a client device 102, a remote server 104, and an intermediary server 108 in the method 400. Also referring to FIGS. 1 and 2, at step 402, the client device 102 can request content from an intermediary server 108. The client device 102 can generate the request to the intermediary server 108 for content in response to rendering a content slot of, for example, a web page. For example, the web page's content slots can include processor executable instructions that can cause the web browser to generate the request to the intermediary server 108. The client device 102 can transmit the request to the remote server 104(1) through any suitable protocol, such as through a HTTPs request or RESTful request. The request can include a device identifier, account identifier, user identifier, session identifier, or other such identifier, or a cookie generated by or provided to the client device 102. For example, the remote server 104(1) may have previously provided a cookie to client device 102 (e.g. during an authentication procedure or other such event), and client device 102 may provide the same cookie in the request thereafter.

At step 404, responsive to the request, the intermediary server 108 can select content. In some implementations, the intermediary server 108 can select a content server 110 that can select or provide the content. For example, the intermediary server 108 can select a content server 110 from a list of content servers 110 using a round robin or other load balancing system, or via an auction-based system. The content server 110 can select a content item to return in response to the request and can transmit the content item directly to the client device 102 or to the client device 102 via the intermediary server 108. For example, the content server 110 can transmit the content item to the intermediary server 108, which can transmit the content item to the client device 102. At step 406, the intermediary server 108 can transmit the content to the client device 102 as a response to the request at step 402.

At step 408, the content item can be registered with the client device 102. The content can include a payload (e.g., non-visible data) and processor executable instructions. Execution of the processor executable instructions during the rendering of the content can generate a call to the API provided by the conversion engine 212. Through the API call, the content item can pass a payload to the conversion engine 212 to register the content item with the client device 102. The payload can include, for example, a URL of a landing page, a campaign ID, one or more identifiers, and a reporting URL. The campaign ID can identify the content item to the intermediary server 108 or a content server 110. Content items of a same type, from a same third-party, or that are otherwise related can include the same campaign ID.

In some implementations, the conversion engine 212 can include one or more registration policies. The conversion engine 212 can determine whether the registration policy is met before registering the content with the client device 102. The registration policies can be set or controlled by a user of the client device 102. For example, the user can generate white lists or black lists that indicate what content (or type thereof) can be registered by the conversion engine 212. The white lists and the black lists can indicate providers of the content (e.g., intermediary servers 108, remote servers 104, or content servers 110) by a URL. The white lists and the black lists can indicate types of content that can be registered. For example, the user may black list video content such that no video content (irrespective of the provider) can register with the conversion engine 212. The registration policies can include one or more requirements that must be met before the content can be registered. For example, in some implementations, the conversion engine 212 may only register the content if the content is displayed to the user for a predetermined length of time. The conversion engine 212 can generate or execute a timer script that activates (e.g., starts) when the content item is rendered and displayed to the user. The conversion engine 212 can end when the window containing the content item is closed, the user navigates to a different web page, or the content is otherwise no longer available or displayed to the user. The user can set a time threshold (e.g., 10 seconds, 30 seconds, 1 minute). The conversion engine 212 may only register the content item if the length of time the content is displayed surpasses the time threshold. The registration policy can set a display frequency for registration. The display frequency can be a number of times per time window that the content item has to be displayed before the content item can be registered with the conversion engine 212. The time window can be 1 day, 1 week, 1 month, or 3 months. For example, the registration policy can indicate that the content item needs to be displayed at least twice with a month before the content item can be registered. In these implementations, the conversion engine 212 can register the content item into the registration table 214 as a candidate content item. The conversion engine 212 can periodically purge (e.g., delete) candidate content items from the registration table 214 that do not meet the display frequency within a predetermined threshold. For example, the conversion engine 212 can purge the candidate content items every hour, day, week, or month, and purge the candidate content items that have a display frequency below the display frequency indicated by the registration policy. Content items in the registration table 214 may not be available for matching with incoming URLs until the content item is displayed a number of times above the display frequency and the conversion engine 212 removes a candidate tag from the content item's entry in the registration table 214. In some implementations, the user can select to purge, reset, or otherwise delete the registration table 214. For example, the conversion engine 212 can automatically delete entries in the registration table 214 that are older than a day, week, month, or 3 months. In some implementations, the user can deactivate the conversion engine 212 such that content items cannot be entered into the registration table 214.

The registration policies can include visibility requirements. In some implementations, the content from the intermediary server 108 may not present visually to a user when rendered. For example, the content may only include processor executable instructions that cause the client device 102 to generate a request to a third party and the content may not include text, images, audio, or other data that is rendered and displayed to the user. In another example, the content may render to a relatively small dimensional size or otherwise be hidden from the user when displayed. For example, the content may render to only a single pixel. The visibility requirement of the registration policy can indicate a required size of the content, when rendered, for the content to be registered. For example, the visibility requirements can indicate that the rendered content must be at least 5 pixels×5 pixels for the conversion engine 212 to authorize registration of the content. If, in this example, the rendered content is less than 5 pixels×5 pixels, the conversion engine 212 can determine not to register the content item.

At step 410, the client device 102 can generate a request for content. The step 410 can, in this example, occur once the registration table 214 is populated with one or more entries. The remote server 104 can host one or more web pages. In some implementations, one or more of the web pages can be a landing page for one of the content items registered in the registration table 214. The web page can be a landing page for a content item when the content item includes a URL that directs a web browser to the web page. The client device 102 can transmit the request to the remote server 104 through any suitable protocol, such as through a HTTPs request or RESTful request. At step 412, the remote server 104 can select the content identified in the request. For example, the request can include a URL and the remote server 104 can fetch the web page located at the URL. At step 414, the remote server 104 can transmit the content to the client device 102.

At step 416, the client device 102 can render the content from the remote server 104. The content from the remote server 104 can be a web page. In some implementations, the conversion engine 212 can execute a JavaScript (or other processor executable) timer when the application 208 (e.g., the web browser) beings to render the web page from the remote server 104. The conversion engine 212 can run the timer until the web browser of the client device 102 navigates to another web page or closes the window displaying the web page. The web page can be associated with a URL. The conversion engine 212 can determine or receive the URL from the web browser. For example, the conversion engine 212 can make a call to the web browser for the URL in the location bar of the web browser's front most or active window.

At step 418, the conversion engine 212 can determine if the content is registered. For example, the conversion engine 212 can determine whether the web page returned from the remote server 104 is registered in the registration table 214 or associated with an entry of the registration table 214. For example, as described above, the conversion engine 212 can register content items in the registration table 214. The content items can include payloads that are included as entries in the registration table 214. The entry for a content item in the registration table 214 can include a landing page URL, one or more identifiers, or other data. The registration table 214 can be indexed by landing page URL. The conversion engine 212 can search the registration table 214 for the URL of the web page provided by the remote server 104 at steps 412 and 414. The conversion engine 212 determine whether the web page's URL matches one of the landing page URLs saved to the registration table 214 by performing a lookup or search of the registration table 214 using the URL as an input key to the registration table 214. If the conversion engine 212 finds the web page's URL in the registration table 214, the client device 102 previously received a content item from an intermediary server 108 or content server 110 that indicated the web page (from the remote server 104 at steps 412 and 414) was the landing page for the content item. If the conversion engine 212 does not find a match to the URL, the web page did not serve as a landing page for a previously received content item and the method 400 can end at step 420. If the content is registered the method 400 can continue to step 422.

At step 422, the conversion engine 212 can determine whether reporting is authorized. The conversion engine 212 can reference a reporting policy to determine whether the reporting is authorized. The reporting policy can include rules for whether the rendering of the content can be reported. For example, the reporting policy can include a display time requirement. The display time requirement can be a length of time in seconds, minutes, or hours. The display time requirement can be set by the user or the intermediary server 108. The display time requirement can indicate a length of time for which the remote server's content must be displayed after being rendered at step 416 before the conversion engine 212 will generate a reporting message for the content. For example, as described above, the conversion engine 212 can set a timer when the content is rendered to the user. Responsive to the close of the window containing the content, the conversion engine 212 can compare the time determined by the timer to the display time requirement. If the displayed time is less than the display time requirement, the conversion engine 212 can determine that reporting is not authorized. If the displayed time is greater than the display time requirement, the conversion engine 212 can determine that reporting is authorized. The reporting policies can include white lists and blacks lists similar to the white lists and black lists of the registration policies. The user of the client device 102 or the intermediary server 108 can create lists of remote server 104 for which reporting is authorized (white list) or for which reporting is not authorized (black list). If at step 422, the conversion engine 212 determines that reporting is not authorized, the method 400 can end at step 420. If at step 422, the conversion engine 212 determines that reporting is authorized, the method 400 can continue to step 424.

At step 426, the conversion engine 212 can generate a reporting message. As described above, at step 418, the conversion engine 212 can determine that the content is registered in the registration table 214. The conversion engine 212 can retrieve the entry associated with the content from the registration table 214 by, for example, using the URL of the content as a key to perform a lookup in the registration table 214. The content's entry can include the above described payload, which can include one or more identifiers (e.g., a campaign ID) and one or more URLs (e.g., a reporting URL). The reporting message can be a pingback response. The pingback response can be a XML remote procedural call. The response can be transmitted to a destination over HTTP or HTTPS and the response's payload can be encoded with XML. The destination of the reporting message can be the reporting URL retrieved from the registration table 214. The response payload can include the one or more identifiers. The identifiers can be or can include the device ID 210, the campaign ID, or a combination thereof. For example, the conversion engine 212 can concatenate the most significant bits of the device ID 210 with the campaign ID. Part or all of the response payload can be encrypted or hashed. For example, the conversion engine 212 can generate a portion of the response by hashing inputs from browser-, application-, device-, or session-specific identifiers, device types or serial numbers, clock skew times, hardware identifiers, or any other such data. In some implementations, the reporting policy can set a size limit (e.g., in bits or characters) for content of the response's payload. For example, the reporting policy can indicate that a reporting message payload is limited to the size and content of the campaign ID. In this example, the response payload can include information about the content that was viewed but not information about the client device 102 that rendered or otherwise received the content.

At step 426, the conversion engine 212 can determine if the reporting messages should be held for a batch transmission. The reporting policy can include a batch transmission flag or bit. When set, the conversion engine 212 can hold reporting messages for batch transmission. If at step 426, the conversion engine 212 determines that the batch transmission flag is set, the method 400 can proceed to a holding phase at step 428. At step 428, the conversion engine 212 can write or save the reporting message to the aggregation table 216. The conversion engine 212 can save the reporting message to the aggregation table 216 with a time stamp that indicates when the reporting message was generated or saved to the aggregation table 216. In some implementations, the reporting policy can include a batch requirement. When the conversion engine 212 determines that the batch requirement has been met, the conversion engine 212 can transmit the reporting messages stored in the aggregation table 216 to their respective destinations as indicated by their respective reporting URLs. The batch requirement can be quantity-based or time-based. The quantity-based batch requirement can set a number of reporting messages that are required to be a in batch transmission. For example, the conversion engine 212 can transmit the reporting messages when 10, 50, or 100 reporting messages are batched (e.g., saved) to the aggregation table 216. The time-based batch requirement can set an interval (e.g., hour, day, week, or month) on which the reporting messages saved to the aggregation table 216 are transmitted.

At step 430, the conversion engine 212 can transmit the response as part of a batch. For example, at step 430 the conversion engine 212 can determine that the batch requirement is satisfied and the conversion engine 212 can retrieve each of the reporting messages from the aggregation table 216. The conversion engine 212 can transmit each of the reporting messages to their respective destinations. If at step 426, the conversion engine 212 determines that a batch transmission flag is not set, the method 400 can proceed to the step 434 and the conversion engine 212 can transmit the reporting message.

At steps 432 and 436, the intermediary server 108 can record the responses. While the reporting messages are illustrated in FIG. 4 as being transmitted to the intermediary server 108, the reporting messages can be transmitted to any server (e.g., a remote server 104, a content server 110, or a proxy server). Similarly, the conversion engine 212 can transmit each of the reporting messages in the batch transmission (at step 430) to different destinations. For example, the conversion engine 212 can transmit a first portion of the reporting messages to a first intermediary server 108, a second portion of the reporting messages to a second intermediary server 108, and a third portion of the reporting messages to a remote server 104. The intermediary server 108, or, more generally, the recipient of the reporting message can record that the reporting message was received. The intermediary server 108 can save an indication of the reporting message to a conversation table. The intermediary server 108 can save the contents of the reporting message to the conversion table. For example, the intermediary server 108 can save a campaign ID of the reporting message to the conversion table. Periodically, the intermediary server 108 can analyze the conversion table to determine, for example, how often a content item from a given content server 110 was viewed and then a client device subsequently and independently navigated to a landing page of the content item.

Accordingly, according to at least one aspect of the disclosure, a method to authorize data transmissions in a networked environment can include receiving, by a web browser executed by a client device, a registration request from a content item displayed by the web browser. The registration request can include a first URL and a second URL. The method can include storing, by the web browser executed by the client device, the first URL, the second URL, and a timestamp to a registration table stored at the client device. The method can include identifying, by the web browser executed by the client device, a third URL of a web page displayed by the web browser. The method can include determining, by the web browser executed by the client device, that the third URL matches the first URL stored in the registration table and a display time of the web page is within a predetermined time duration of the timestamp. The method can include transmitting, by the web browser executed by the client device, a response to the second URL.

In some implementations, the method can include generating, by the web browser, the response to the second URL. The method can include storing, by the web browser, the response to the second URL in an aggregation table. The method can include determining, by the web browser, that a batch requirement is satisfied. The method can include transmitting, by the web browser, the response to the second URL as a batch transmission comprising a plurality of responses.

In some implementations, the method can include determining, by the web browser, a duration of time that the web page is displayed by the web browser. The method can include transmitting, by the web browser, the response to the second URL responsive to the duration of time that the web page is displayed by the web browser being above a predetermined threshold.

In some implementations, the method can include determining, by the web browser, a duration of time that the content item is displayed by the web browser. The method can include storing, by the web browser, the first ULR, the second URL, and the timestamp responsive to the duration of time that the content item is displayed by the web browser being above a predetermined threshold.

In some implementations the method can include determining, by the web browser executed by the client device, that the first URL and the second URL were stored at the web browser for less than a predetermined length of time. The method can include deleting, by the web browser, the first URL and the second URL from a conversion table, stored at the client device, after a predetermined length of time. The registration request comprises an application programing interface (API) call having a data payload. The method can include transmitting at least a portion of the data payload to the second URL in the response. The method can include setting a payload limit for the response to the second URL. The method can include transmitting the response to the second URL via a proxy server.

According to at least one aspect of the disclosure, a system to authorize data transmissions in a networked environment can include a web browser executed by a client device. The web browser can execute a conversion engine to receive a registration request from a content item displayed by the web browser. The registration request can include a first URL and a second URL. The conversion engine can store the first URL, the second URL, and a timestamp to a registration table stored at the client device. The conversion engine can identify a third URL of a web page displayed by the web browser. The conversion engine can determine that the third URL matches the first URL stored in the registration table and a display time of the web page is within a predetermined time duration of the timestamp. The conversion engine can transmit a response to the second URL.

In some implementations, the web browser can generate the response to the second URL. The web browser can store the response to the second URL in an aggregation table. The web browser can determine that a batch requirement is satisfied and transmit the response to the second URL as a batch transmission comprising a plurality of responses.

In some implementations, the web browser can determine a duration of time that the web page is displayed by the web browser. The web browser can transmit the response to the second URL responsive to the duration of time that the web page is displayed by the web browser being above a predetermined threshold.

In some implementations, the web browser can determine a duration of time that the content item is displayed by the web browser. The web browser can store the first ULR, the second URL, and the timestamp responsive to the duration of time that the content item is displayed by the web browser being above a predetermined threshold.

The web browser can determine that the first URL and the second URL were stored at the web browser for less than a predetermined length of time. The web browser can delete the first URL and the second URL from a conversion table, stored at the client device, after a predetermined length of time. The registration request comprises an application programing interface (API) call having a data payload.

In some implementations, the web browser can transmit at least a portion of the data payload to the second URL in the response. The web browser can set a payload limit for the response to the second URL. The web browser can transmit the response to the second URL via a proxy server. In some implementations, the proxy server can hide client device IP address from third-party servers such that the client device's IP address can't be tracked. The proxy can also aggregate reporting messages from multiple client devices to generate batch reporting and protection individual user privacy.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method to authorize data transmissions in a networked environment, comprising:
receiving, by a web browser executed by a client device, a registration request from a content item displayed by the web browser, wherein the registration request comprises a first uniform resource locator (URL) and a second URL;
determining, by the client device, that the content item displayed by the web browser executed by the client device is registered with the web browser based on a match between a web page URL and the first URL received in the registration request, wherein the content item links to the web page URL;
determining, for a web page located at the web page URL, that a display time within the web browser is at least a predetermined amount of time; and
in response to determining (i) that the content item is registered based on the match between the web page URL and the first URL and (ii) that the display time is at least the predetermined amount of time:
generating, by the client device, a reporting message to the second URL based on (i) the match between the web page URL and the first URL and (ii) the display time being at least the predetermined amount of time, wherein the second URL is different from the web_page URL and the first URL; and
transmitting, by the web browser executed by the client device, the reporting message to the second URL based on (i) the match between the web page URL and the first URL and (ii) the display time being at least the predetermined amount of time.

2. The method of claim 1, wherein transmitting, by the client device, the reporting message to the second URL comprise:
storing, by the client device, the reporting message in an aggregation table;
determining, by the client device, that a batch requirement is satisfied; and
transmitting, by the client device, the reporting message to the second URL as a batch transmission comprising a plurality of messages.

3. The method of claim 1 further comprising:
determining, by the client device, transmission of the reporting message is authorized based on a reporting policy.

4. The method of claim 1, further comprising:
determining, by the client device, a duration of time that the web page is displayed by the client device; and
transmitting, by the client device, the reporting message to the second URL responsive to the duration of time exceeding a predetermined threshold.

5. The method of claim 1, further comprising:
determining, by the client device, a duration of time that the web page is displayed by the client device; and
storing, by the client device, the first URL, the second URL, and a timestamp responsive to the duration of time exceeding a threshold.

6. The method of claim 1, further comprising:
determining, by the client device, that the first URL and the second URL were stored at the web browser for less than a predetermined duration.

7. The method of claim 1, further comprising:
deleting, by the client device, the first URL and the second URL from a conversion table stored at the client device, responsive to a difference between a storage time of the first URL and the second URL and a present time exceeding a threshold.

8. The method of claim 1, wherein the first URL is stored in correspondence with the second URL in a registration table.

9. The method of claim 8, further comprising:
transmitting at least a portion of data stored in correspondence with the first URL in the reporting message.

10. A system to authorize data transmissions in a networked environment, comprising:
a client device comprising one or more processors that executes a web browser, the web browser executing a conversion engine configured to perform operations comprising:
receiving a registration request from a content item displayed by the web browser, wherein the registration request comprises a first uniform resource locator (URL) and a second URL;
determining that the content item displayed by the web browser executed by the client device is registered with the web browser based on a match between a web page URL and the first URL received in the registration request, wherein the content item links to the web page URL;
determining, for a web page located at the web page URL, that a display time within the web browser is at least a predetermined amount of time; and
in response to determining (i) that the content item is registered based on the match between the web page URL and the first URL and (ii) that the display time is at least the predetermined amount of time:
generating a reporting message to the second URL based on (i) the match between the web page URL and the first URL and (ii) the display time being at least the predetermined amount of time, wherein the second URL is different from the web_page URL and the first URL; and
transmitting the reporting message to the second URL based on (i) the match between the web page URL and the first URL and (ii) the display time being at least the predetermined amount of time.

11. The system of claim 10, wherein transmitting the reporting message to the second URL comprise:
storing the reporting message in an aggregation table;
determining that a batch requirement is satisfied; and
transmitting the reporting message to the second URL as a batch transmission comprising a plurality of messages.

12. The system of claim 10, wherein the operations further comprise:
determining transmission of the reporting message is authorized based on a reporting policy.

13. The system of claim 10, wherein the operations further comprise:
determining a duration of time that the web page is displayed by the client device; and
transmitting the reporting message to the second URL responsive to the duration of time exceeding a predetermined threshold.

14. The system of claim 10, wherein the operations further comprises:
determining a duration of time that the web page is displayed by the client device; and
storing the first URL, the second URL, and a timestamp responsive to the duration of time exceeding a threshold.

15. The system of claim 10, wherein the operations further comprise:
   determining that the first URL and the second URL were stored at the web browser for less than a predetermined duration.

16. The system of claim 10, wherein the operations further comprise:
   deleting the first URL and the second URL from a conversion table stored at the client device, responsive to a difference between a storage time of the first URL and the second URL and a present time exceeding a threshold.

17. The system of claim 10, wherein the first URL is stored in correspondence with the second URL in a registration table.

18. The system of claim 17, wherein the operations further comprise:
   transmitting at least a portion of data stored in correspondence with the first URL in the reporting message.

* * * * *